United States Patent
Lawton et al.

(10) Patent No.: US 9,176,688 B2
(45) Date of Patent: Nov. 3, 2015

(54) ENVIRONMENTAL WATERMARKING A PRINT REQUEST

(75) Inventors: Robert J Lawton, Meridian, ID (US); Jerry A Young, Nampa, ID (US); George B Clifton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/394,257

(22) PCT Filed: Jun. 26, 2012

(86) PCT No.: PCT/US2012/044228
§ 371 (c)(1),
(2), (4) Date: Oct. 13, 2014

(87) PCT Pub. No.: WO2014/003724
PCT Pub. Date: Jan. 3, 2014

(65) Prior Publication Data
US 2015/0077811 A1    Mar. 19, 2015

(51) Int. Cl.
| | |
|---|---|
| *G06K 15/02* | (2006.01) |
| *H04N 1/00* | (2006.01) |
| *G06F 3/12* | (2006.01) |
| *G06K 15/00* | (2006.01) |
| *G06Q 10/06* | (2012.01) |
| *H04N 1/32* | (2006.01) |

(52) U.S. Cl.
CPC ............ *G06F 3/1242* (2013.01); *G06F 3/1218* (2013.01); *G06F 3/1221* (2013.01); *G06F 3/1285* (2013.01); *G06K 15/4055* (2013.01); *G06Q 10/06* (2013.01); *H04N 1/00896* (2013.01); *H04N 1/00954* (2013.01); *H04N 1/32149* (2013.01)

(58) Field of Classification Search
None
See application file for complete search history.

(56) References Cited

U.S. PATENT DOCUMENTS

| | | | |
|---|---|---|---|
| 8,190,467 B2 | 5/2012 | Letendre-Hedlund | |
| 8,223,401 B2 * | 7/2012 | Miyagi et al. | 358/2.1 |
| 8,520,227 B2 * | 8/2013 | Toizumi et al. | 358/1.13 |
| 8,879,081 B2 * | 11/2014 | Takagi | 358/1.13 |
| 2009/0171992 A1 | 7/2009 | Roberts | |
| 2009/0313060 A1 | 12/2009 | Evevsky | |
| 2009/0314837 A1 | 12/2009 | Kataoka et al. | |
| 2010/0073706 A1 | 3/2010 | Chan | |
| 2011/0145085 A1 | 6/2011 | Khachatrian et al. | |
| 2011/0273739 A1 | 11/2011 | Grasso et al. | |
| 2013/0094063 A1 * | 4/2013 | Takagi | 358/3.28 |

FOREIGN PATENT DOCUMENTS

KR    10-2008-0055307        6/2008

OTHER PUBLICATIONS

PCT; "Notification of Transmittal of the International Search Report and the Written Opinion of the International Searching Authority, or the Declaration"; cited in PCT/US2012/044228; mailed Jan. 30, 2013; 10 pages.

The PaperMillStore.com; "Eco Logo Usage Guidelines"; 5pages.

* cited by examiner

*Primary Examiner* — Scott A Rogers
(74) *Attorney, Agent, or Firm* — Hewlett-Packard Patent Department

(57) ABSTRACT

Embodiments of the present invention disclose a method and system for environmental watermarking. According to one embodiment, a print request is received at a printing device coupled to a processing unit, which evaluates whether an environmental print criteria has been satisfied. The document along with an environmental watermark image is printed on the print media upon determination that at least one environmental print criterion has been satisfied.

13 Claims, 3 Drawing Sheets

ENVIRONMENTAL WATERMARKING A PRINT REQUEST

BACKGROUND

The interest in environmentally-friendly solutions has increased tenfold in the last decade as people become more educated and focused on conserving natural resources and the environment by reducing the negative impacts of human involvement. Sustainable development, energy conservation, and waste management are a few of the major tenets of environmental technology. In addition, green computing involves the practice of designing, manufacturing, using, and/or disposing of computing equipment including servers, monitors, printers, storage devices for example, in an efficient manner so as to have little to no environmental impact. To this end, many corporations are striving to find ways to demonstrate to customers that they are doing everything possible to reduce their environmental impact.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
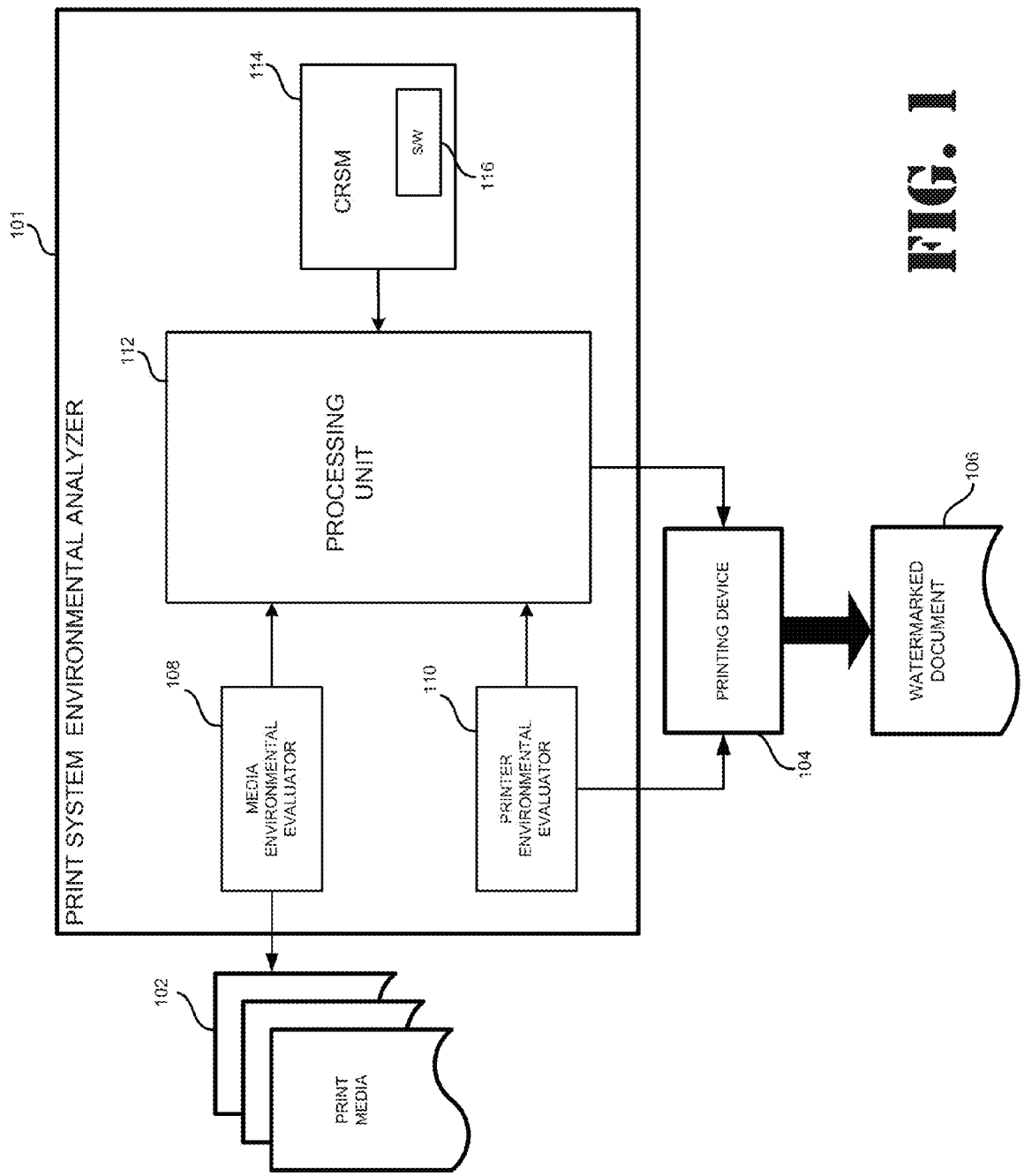
FIG. 1 is a simplified block diagram of the environmental watermarking system according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Examples of the present invention provide a method and system for environmental watermarking a print document. According to one example embodiment, an "environmental watermark" is placed on pages generated by the printing device based on preset criteria relating to environmental friendliness of the printer device and/or print media. This environmental watermark affords companies an opportunity to advertise on each page or job printed both their company logo and the fact that they are taking action to minimize their environmental impact.

Referring now in more detail to the drawings in which like numerals identify corresponding parts throughout the views, FIG. 1 is a simplified block diagram of the environmental watermarking system according to an example of the present invention. As shown in this example, the system 100 includes a print system environmental analyzer 101, print media 102, and a printing device 104. In accordance with one example embodiment, the print system environmental analyzer 101 includes a media environmental evaluator 108, a printer environmental evaluator 110, a processing unit 112, and a computer readable storage medium 114. More particularly, print media 102 represents paper or similar material used by the printing device 104 for embedded text and/or graphics thereon. The printing device 104 may be a commercial laser jet printer, consumer printing device, or any printing device capable of evaluating the environmental data of the printer and associated print media 102, which may be stored in a printer tray or manually fed into the printing device 102.

Processing unit 112 represents a central processing unit (CPU), microcontroller, microprocessor, or logic configured to analyze and execute programming instructions associated with the print system analyzer 101. The media environmental evaluator 108 is configured to detect and evaluate the environmental friendliness of the print media 102. As used herein, environmental friendliness refers to products, methods, and/or processes that aid in conserving natural resources or contribute to "green living" (e.g., products made from recycled materials). Similarly, the printer environmental evaluator 110 is configured to detect and evaluate the environmental friendliness of the printing device 104. Based on the environmental friendliness of the printing device 104 and/or print media 102, the processing unit 112 may send a flag to printing device that an eco-friendly condition (i.e., environmental print criteria) has been met so as to cause a watermarked document 106 to be output from the printing device 104. Storage medium 114 represents volatile storage (e.g. random access memory), non-volatile store (e.g. hard disk drive, read-only memory, compact disc read only memory, flash storage, etc.), or combinations thereof. Furthermore, storage medium 110 includes software 116 that is executable by processor 112 and, that when executed, causes the processing unit 112 to perform some or all of the functionality described herein. Moreover, the media environmental evaluator 108 and printer environmental evaluator 110 may be implemented as executable programming modules within the storage medium 114. According to one example, elements of the print system environmental analyzer 101 are implemented as upgradeable firmware for execution within existing print systems.

Figure 2:
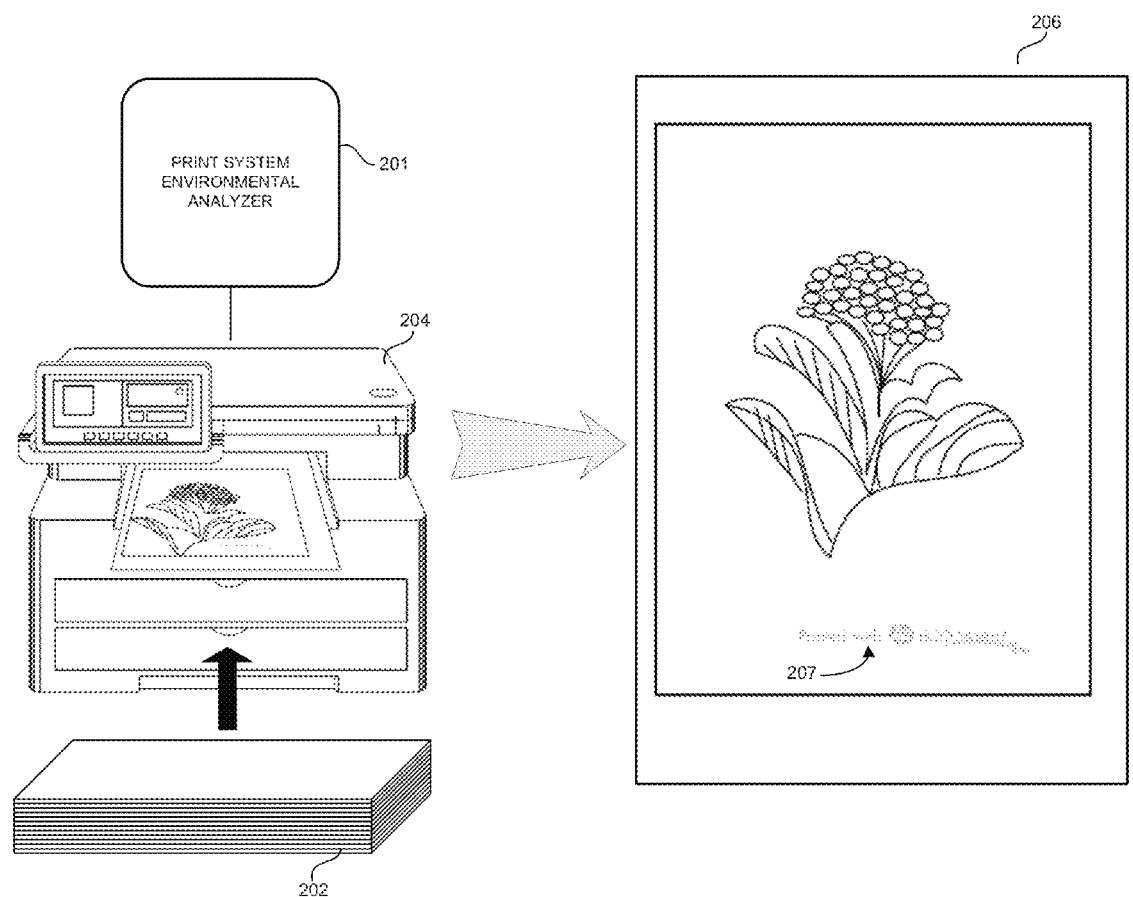
FIG. 2 is an illustration of the environmental watermarking system and watermarked document produced thereby according to an example of the present invention.

FIG. 2 is an illustration of the environmental watermarking system and sample watermarked document produced thereby according to an example of the present invention. As shown here, the print system environmental analyzer 201, which may be an external or internal component of the printing device 204, communicates with the printing device 204 to evaluate the settings of the printing device 204 and attributes of the print media 202 so as to produce a watermarked document 206. More particularly, the print system environmental analyzer 201 evaluates several criteria to determine if minimum requirements have been met to certify the document or job was printed and delivered in a manner considered environmentally friendly, or "Environmental Best in Class" (EBC). If the environment print criteria or EBC status is met or satisfied (and an "environmental watermark" setting has been enabled), a small watermark 207 is placed in the margin of each page or on the last page of each job advertising that the document was printed using a carbon footprint optimized system of document generation. The watermark 207 may include a logo including the company name, servicing company, or combination thereof. The environmental print criteria or EBC media attributes for the print media 202 (i.e., environmental media criteria) may include a threshold of less than 64 gms base weight, inclusion of a Forest Stewardship Council (FSC) or similar certification with the print media 202, and/or verification that the print media 202 was regionally or locally produced for example. Still further, the media packaging may contain a lot by lot coding to authenticate EBC status. In such a scenario, the EBC-related code may be entered on the printing device 204 via the front panel or scanner for example. Environmental print criteria may include EBC printer attributes relating to the printing device 204 (i.e., environmental printer criteria) may Include an indication for energy consumption as it relates to the particular speed and class of the printer device or that the print mode settings are set to achieve energy consumption (e.g. light fuser mode, duplex, sleep set to minimum, etc.). Furthermore, the system may be configured such that the environmental watermark 207 is placed on the document 206 when only one environmental print criterion is satisfied (i.e., one printer criterion or one media criterion), when environmental print criteria is satisfied for either the printer or media, or when environmental print criteria is satisfied for both the printer and media.

Figure 3:
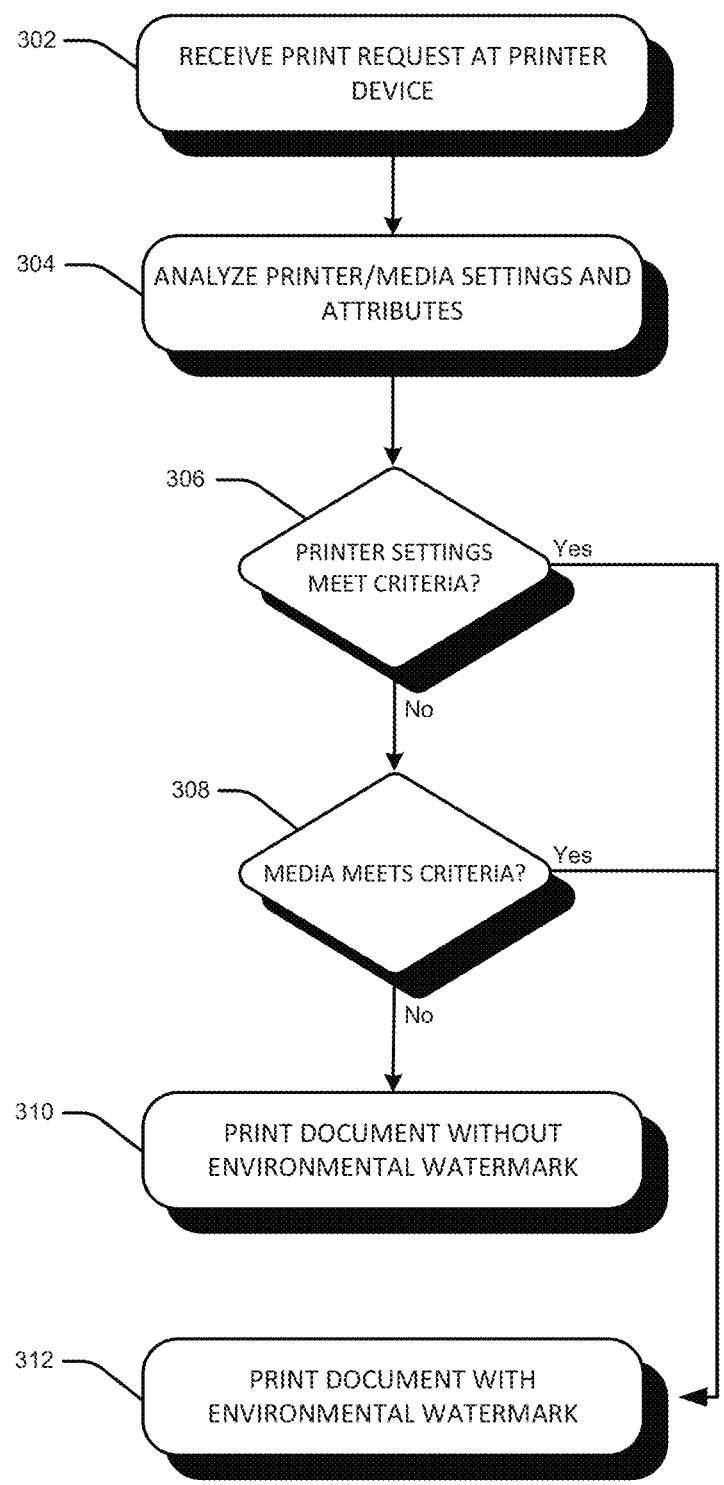
FIG. 3 is a simplified flow chart of the processing steps for the providing an environmental watermark in accordance with one example of the present invention.

FIG. 3 is a simplified flow chart of the processing steps for the providing an environmental watermark in accordance with one example of the present invention. In step 302, the user sends a print job to the printing device with an indication for "environmental watermarking", which is received at the printing device. In step 304, the processing unit or printer environmental evaluator analyzes the settings and attributes of the printer device and/or print media respectively. If it is determined that the printer device satisfies one or more environmental printer criterion in step 306, then the print job or document is printed by the printing device along with an environmental watermark image on one or more pages in step 312. If the printer settings do not satisfy the criteria (or if additional criteria is needed), then the print media is evaluated by the processing unit or media environmental evaluator for assessment on whether the print media conforms to one or more environmental media criterion in step 308. If the condition is satisfied (i.e., print media is flagged by processing unit as complying with the environmental print criteria), then the print job or document is printed by the printing device along with an environmental watermark image on one or more pages in step 312. However, if neither the printer nor the print media satisfy the threshold for EBC status or environmental print criteria, then the document or print job is printed by the printer device without inclusion of the environmental watermark in step 310.

Embodiments of the present invention provide method and system for environmental watermarking a print document. Moreover, many advantages are afforded by environmental watermarking system according to embodiments of the present invention. As more and more corporations strive to find ways to display their eco-friendly methods and practices to clients and the public at large, the environmental watermark system provides them with a robust and simple method to advertise with a unique and customizable watermark which certifies that with each print page/job that they have acted responsibly in this regard.

Furthermore, while the invention has been described with respect to exemplary embodiments, one skilled in the art will recognize that numerous modifications are possible. Thus, although the invention has been described with respect to exemplary embodiments, it will be appreciated that the invention is intended to cover all modifications and equivalents within the scope of the following claims.

What is claimed is:

1. A method for environmental watermarking comprising:
  receiving, at a processing unit connected with a printing device, a print request associated with a document to be printed on a print media by the printing device;
  evaluating whether at least one environmental print criterion is satisfied for the print request, wherein the at least one environmental print criterion comprises at least one printer criterion of at least one setting of the printing device relating to environmental friendliness, wherein the at least one printer criterion includes a verification that a current print mode setting enables a particular energy consumption or that the printing device includes a certification for energy consumption; and
  printing the document on the print media along with an environmental watermark image when the at least one environmental print criterion is satisfied.

2. The method of claim 1, wherein the evaluating whether the at least one environmental print criterion is satisfied further comprises:
  determining, via the processing unit, that an attributes of the print media for which the document is to be printed on by the printing device meets at least one media criterion relating to environmental friendliness.

3. The method of claim 2, wherein the environmental watermark image is printed on the document when the at least one setting of the printing device meets the at least one printer criterion and the print media meets the at least one media criterion relating to environmental friendliness.

4. The method of claim 3, wherein the at least one printer criterion includes a verification that the current print mode setting enables a light fuser mode or a duplex mode.

5. The method of claim 3, wherein the at least one media criterion includes the print media having an environmentally-friendly certification or an indication that the print media was produced locally.

6. A non-transitory computer readable storage medium having stored executable instructions, that when executed by a processor, causes the processor to:
  receive a print request associated with a document to be printed on a print media by the printing device;
  evaluate whether at least one environmental print criterion is satisfied for the print request, wherein the at least one environmental print criterion comprises at least one printer criterion of at least one setting of the printing device relating to environmental friendliness, wherein the at least one printer criterion includes a verification that a current print mode setting enables a particular energy consumption or that the printing device includes a certification for energy consumption; and
  print the document on the print media along with an environmental watermark image when the at least one environmental print criterion is satisfied.

7. The non-transitory computer readable storage medium of claim 6, wherein the instructions that cause the processor to evaluate whether the at least one environmental print criterion is satisfied includes executable instructions that further cause the processor to:
  determine that at least one attribute of the print media for which the document is to be printed on by the printing device meets one or more media criteria relating to environmental friendliness.

8. The non-transitory computer readable storage medium of claim 7, wherein the environmental watermark image is printed on the document when the at least one setting of the printing device meets the at least one printer criterion and the at least one attribute of the print media meets the one or more media criteria relating to environmental friendliness.

9. The non-transitory computer readable storage medium of claim 8, wherein the at least one printer criterion includes a verification that the current print mode setting enables a light fuser mode or a duplex mode.

10. The non-transitory computer readable storage medium of claim 8, wherein the one or more media criteria include the print media having an environmentally-friendly certification or an indication that the print media was produced locally.

11. An environmental watermarking system for a print document, the system comprising:
  a printing device; and
  a processing unit configured to process print requests associated with the print document to be printed on a print media by the printing device and evaluate whether at least one environmental print criterion is satisfied for the print requests, wherein the at least one environmental print criterion comprises at least one printer criterion of at least one setting of the printing device relating to environmental friendliness, wherein the at least one printer criterion includes a verification that a current print mode setting enables a particular energy consumption or that the printing device includes a certification for energy consumption,
  wherein an environmental watermark is printed along with the print document on the print media upon a determination that the at least one environmental print criterion is satisfied.

12. The system of claim 11, wherein the environmental watermark is printed with the print document when the at least one setting of the printing device and the print media for which the print document is to be printed on by the printing device meets a predetermined threshold relating to environmental friendliness.

13. The system of claim 12, wherein the predetermined threshold includes the printing device having a verification that the current print mode setting enables a light fuser mode or a duplex mode, and
  wherein the predetermined threshold includes the print media having an environmentally-friendly certification or an indication that the print media was produced locally.

* * * * *